(12) United States Patent
Cocuzza et al.

(10) Patent No.: US 10,598,049 B2
(45) Date of Patent: Mar. 24, 2020

(54) EVAPORATOR WITH INTEGRATED HEAT RECOVERY

(71) Applicant: Enviro Power LLC, Hartford, CT (US)

(72) Inventors: Michael A Cocuzza, Middletown, CT (US); Graham H Steen, Middletown, CT (US)

(73) Assignee: Enviro Power, Inc., Hartford, CT (US)

( * ) Notice: Subject to any disclaimer, the term of this patent is extended or adjusted under 35 U.S.C. 154(b) by 0 days.

(21) Appl. No.: 16/275,750

(22) Filed: Feb. 14, 2019

(65) Prior Publication Data

US 2019/0178109 A1 Jun. 13, 2019

Related U.S. Application Data

(63) Continuation of application No. PCT/US2018/054197, filed on Oct. 3, 2018.

(60) Provisional application No. 62/567,300, filed on Oct. 3, 2017.

(51) Int. Cl.
| | |
|---|---|
| *F01K 11/02* | (2006.01) |
| *F01K 7/16* | (2006.01) |
| *F01K 9/00* | (2006.01) |

(52) U.S. Cl.
CPC ............... *F01K 11/02* (2013.01); *F01K 7/16* (2013.01); *F01K 9/003* (2013.01)

(58) Field of Classification Search
CPC ............ F01K 11/02; F01K 9/003; F01K 7/16
See application file for complete search history.

(56) References Cited

U.S. PATENT DOCUMENTS

| | | | |
|---|---|---|---|
| 379,421 | A | 3/1888 | Serpollet |
| 733,862 | A | 7/1903 | Miller |
| 1,675,600 | A | 7/1928 | Doble |
| 2,367,870 | A | 1/1945 | Joslyn |

(Continued)

FOREIGN PATENT DOCUMENTS

| | | |
|---|---|---|
| CN | 2808912 | 8/2006 |
| CN | 205618211 | 10/2016 |

(Continued)

OTHER PUBLICATIONS

"CRES Inline-Instant Steam Generator," Brochure, Infinity Fluids Corporation, Worcester, MA.

(Continued)

*Primary Examiner* — Mark A Laurenzi
*Assistant Examiner* — Shafiq Mian
(74) *Attorney, Agent, or Firm* — Alix, Yale & Ristas, LLP

(57) ABSTRACT

An evaporator with integrated heat recovery incorporates a vapor tube in a combustion chamber surrounded by a water jacket. The water jacket is in fluid communication with an exhaust gas heat exchanger. Coolant circulates through the exhaust gas heat exchanger to recover heat from exhaust gasses leaving the combustion chamber and then circulates through the water jacket surrounding the combustion chamber to recover heat not delivered to the operating fluid. The evaporator may incorporate a condenser within the housing and in fluid communication with the exhaust gas heat exchanger and water jacket. Coolant may enter the evaporator housing at the condenser before circulating through the exhaust gas heat exchanger and water jacket.

12 Claims, 4 Drawing Sheets

(56) References Cited

U.S. PATENT DOCUMENTS

| | | | |
|---|---|---|---|
| 2,621,635 A | 12/1952 | Joosten | |
| 3,478,726 A | 11/1969 | Kikinis | |
| 3,556,059 A | 1/1971 | Gorzegno et al. | |
| 3,642,384 A | 2/1972 | Huse | |
| 3,773,019 A | 11/1973 | Hapgood | |
| 3,899,031 A * | 8/1975 | Laessig | F22B 27/08 |
| | | | 122/250 R |
| 3,954,087 A | 5/1976 | Stevens et al. | |
| 3,982,695 A * | 9/1976 | Burchett | B05B 7/1613 |
| | | | 239/136 |
| 4,287,430 A | 9/1981 | Guido | |
| 4,290,389 A | 9/1981 | Palchik | |
| 4,355,602 A | 10/1982 | Cooke | |
| 4,573,323 A | 3/1986 | Mock | |
| 4,612,879 A | 9/1986 | Cooke | |
| 4,715,192 A | 12/1987 | Katz | |
| 4,759,314 A | 7/1988 | Banweg et al. | |
| 5,704,209 A | 1/1998 | Bronicki et al. | |
| 6,089,837 A | 7/2000 | Cornell | |
| 6,167,706 B1 | 1/2001 | Bronicki et al. | |
| 6,367,261 B1 | 4/2002 | Marshall et al. | |
| 6,543,480 B1 | 4/2003 | Mazzei et al. | |
| 6,598,397 B2 | 7/2003 | Hanna et al. | |
| 6,629,412 B1 | 10/2003 | Labinov et al. | |
| 7,066,396 B2 | 6/2006 | Knight et al. | |
| 7,174,716 B2 | 2/2007 | Brasz et al. | |
| 7,211,926 B2 | 5/2007 | Teets et al. | |
| 7,743,872 B2 | 6/2010 | Brookman | |
| 7,882,692 B2 | 2/2011 | Pronske et al. | |
| 8,375,719 B2 | 2/2013 | Rhodes et al. | |
| 8,459,391 B2 | 6/2013 | Brookman et al. | |
| 8,497,452 B2 | 7/2013 | Evans | |
| 8,635,870 B2 | 1/2014 | Kasuya et al. | |
| 8,683,801 B2 | 4/2014 | Ernst et al. | |
| 8,820,078 B1 | 9/2014 | Duffy | |
| 8,955,467 B1 * | 2/2015 | Horne | F22B 7/12 |
| | | | 122/110 |
| 9,217,370 B2 | 12/2015 | Wang et al. | |
| 9,822,790 B2 | 11/2017 | Asti et al. | |
| 2003/0213246 A1 | 11/2003 | Coll et al. | |
| 2003/0213248 A1 | 11/2003 | Osborne et al. | |
| 2003/0213854 A1 | 11/2003 | Stickford et al. | |
| 2004/0144093 A1 | 7/2004 | Hanna et al. | |
| 2006/0016401 A1 * | 1/2006 | Loving | F22B 21/26 |
| | | | 122/250 R |
| 2008/0229747 A1 | 9/2008 | Yatsuzuka et al. | |
| 2008/0271454 A1 | 11/2008 | Hansen | |
| 2008/0282701 A1 | 11/2008 | Komaki et al. | |
| 2010/0154725 A1 | 6/2010 | Janvier | |
| 2010/0242476 A1 | 9/2010 | Ast et al. | |
| 2012/0138278 A1 | 6/2012 | Pacholski | |
| 2013/0133868 A1 | 5/2013 | Lehar et al. | |
| 2013/0161009 A1 | 6/2013 | Price | |
| 2013/0241204 A1 | 9/2013 | Brookman et al. | |
| 2013/0284717 A1 | 10/2013 | Evans | |
| 2015/0267568 A1 | 9/2015 | Hikichi et al. | |
| 2015/0369085 A1 * | 12/2015 | Kosuda | F01K 17/02 |
| | | | 60/661 |
| 2016/0040556 A1 * | 2/2016 | Hikichi | F01K 25/08 |
| | | | 60/670 |
| 2016/0319703 A1 | 11/2016 | Burg et al. | |
| 2017/0183977 A1 | 6/2017 | Brune et al. | |

FOREIGN PATENT DOCUMENTS

| | | |
|---|---|---|
| EP | 0889292 A1 | 1/1998 |
| EP | 1536104 A1 | 6/2005 |
| EP | 2056034 A2 | 5/2009 |
| EP | 2771622 B1 | 6/2018 |
| JP | 2012-163279 A | 8/2012 |
| JP | 2012-251697 A | 12/2012 |
| WO | 2009078577 A1 | 6/2009 |
| WO | 2010037719 A2 | 4/2010 |
| WO | 2017111636 A1 | 12/2016 |

OTHER PUBLICATIONS

International Search Report and Written Opinion dated Dec. 21, 2018 (PCT/US2018/054197).

* cited by examiner

EVAPORATOR WITH INTEGRATED HEAT RECOVERY

The disclosure relates to recovery of heat in an evaporator that generates vapor from an operating fluid for use in Rankine cycle systems, and more specifically to integration of heat exchangers for recovery of thermal energy in such systems into a compact, thermally efficient and cost effective assembly.

BACKGROUND

The Rankine cycle is the fundamental operating cycle of all power plants where an operating fluid is continuously evaporated and condensed. A closed Rankine cycle system includes a boiler or evaporator for the evaporation of an operating fluid, a turbine (or other expander) fed with the vapor to drive a generator or other load, a condenser for condensing the exhaust vapors from the turbine back to liquid, and a pump for recycling the condensed fluid to the boiler/evaporator. Operating fluids for Rankine cycle systems include water and organic refrigerants such as R-245fa or R134a. Selection of operating fluid depends mainly on the temperature range at which the Rankine cycle system will operate, with organic refrigerants best suited to lower operating temperatures and water/steam being best suited for higher operating temperatures. Low operating temperatures may prevail in a waste heat recovery application, while low operating temperatures may be desirable in some small-scale systems configured for use in residential or small business structures. High operating temperatures can result in greater efficiency, but present issues of heat containment and recovery. The division between low operating temperatures and high operating temperatures is generally about 300° F. (148° C.)-350° F. (177° C.).

Steam is used for a wide variety of processes and is commonly employed as an operating fluid in Rankine cycle systems to convert thermal energy into mechanical work, which can be used to generate electricity. The most common way of generating steam is to combust fuel to release heat, which is transferred to water in a heat exchanger which may be referred to as a boiler. Steam boilers typically separate the water into channels or tubes to expand the surface area and enhance transfer of heat to the water. Many steam boilers employ arrangements to recover heat from the exhaust gasses after the gasses have been used to generate steam. Boilers commonly employ housings and insulation to contain the heat from combustion and focus the heat on tubes containing the water. Different arrangements of steam tubes are employed to enhance heat transfer from the hot combustion gasses to the water.

Steam can be generated for delivery at temperatures ranging from 212° F. (100° C.) to temperatures above 900° F. (500° C.). Steam may form at temperatures below 212° F. (100° C.) in low pressure environments, but may have limited utility. Low temperature "saturated" steam is preferred for heating applications, while high temperature "superheated" steam is preferred for power generation and turbines. Superheated steam is steam at a temperature higher than its vaporization (boiling) point at the absolute pressure where the temperature is measured. It will be apparent that generating superheated steam at temperatures above 350° F. requires a higher intensity of heat than generating low temperature saturated steam. The concentrated heat necessary to generate superheated steam for use in a turbine creates challenges in terms of heat containment and recovery when compared to lower temperature systems. For example, exhaust gasses leaving a combustion chamber where superheated steam is generated will be at least as hot as the steam, meaning that significant energy must be recovered from the exhaust gasses to maintain efficiency of the system. Heat lost by conduction and radiation can damage sensitive system components and surrounding materials, and represents potential system inefficiency.

In systems that employ steam to generate electricity, superheated steam is delivered to an expander such as a steam turbine. As the steam passes through the turbine, it delivers motive force to turn a generator, and leaves the turbine as steam at a lower temperature and pressure. After passing through the expander, steam is cooled and condensed back to liquid water in a heat exchanger dedicated to this purpose called a "condenser." This liquid water is then pumped back into the steam generator to complete the cycle. The condenser may be configured to deliver the heat recovered from the turbine exhaust to another system, such as domestic hot water, hydronic heating systems, or an evaporative cooling system such as an absorption chiller. Heat is also commonly recovered from the exhaust gasses leaving the steam generator.

It is common for combined heat and power systems to employ three heat exchange assemblies: the heat source/steam tube exchanger; the condenser; and an exhaust gas heat recovery heat exchanger. These three heat exchangers are typically provided as separate assemblies, which occupy significant space, is inefficient in terms of manufacturing cost, increases the number of potential points of failure, and allows heat leakage by radiation and conduction to the surrounding environment. Large scale steam driven electric generators are typically situated in dedicated purpose-built structures, and are operated by trained personnel. Small scale micro CHP equipment designed for installation in the mechanical room of a home or a small business must be extremely compact and release small amounts of heat to the surrounding environment.

Small scale or "micro" combined heat and power (CHP) systems are being developed for use in residential structures and small businesses. These systems generate steam and employ a steam turbine to generate electricity, with heat recovered from exhaust gasses and the condenser for use by the home or business owner. Micro CHP systems provide back-up power generation, low cost electricity, and heat in a single system, making them attractive alternatives to conventional heating systems. Further, micro CHP systems can be connected to communicate with each other and provide coordinated response to peak power demand or load absorption when renewable sources place excess power on the grid.

There is a need for a compact and cost effective arrangement of a steam generator, turbine, and heat exchangers suitable for micro CHP systems to be installed in residential and small business structures.

There is a need for a compact and thermally efficient arrangement of heat exchangers for use in micro CHP systems which limit heat released to the surrounding environment.

SUMMARY OF THE INVENTION

An evaporator with integrated heat recovery incorporates a vapor tube in a combustion chamber surrounded by a water jacket. The water jacket is in fluid communication with an exhaust gas heat exchanger. Coolant circulates through the exhaust gas heat exchanger to recover heat from exhaust gasses leaving the combustion chamber and then circulates through the water jacket surrounding the combustion chamber to recover heat not delivered to the operating fluid.

A housing of the evaporator surrounds the combustion chamber and exhaust gas heat exchanger and defines an outer boundary of the water jacket. The combustion chamber may be cylindrical and the water jacket may include an annular space surrounding the combustion chamber. The combustion chamber may have a vertical orientation, with an opening for a fuel burner at a top of the combustion chamber and outlets for combustion gasses at a bottom of the combustion chamber. The vapor tube includes an inlet end for receiving operating fluid and an outlet end through which vapor-phase operating fluid leaves the vapor tube. The inlet and outlet ends of the vapor tube may be located outside the evaporator housing. A fuel burner is arranged to release heat and hot combustion gasses into the combustion chamber, where heat is transferred to operating fluid in the vapor tube. The combustion chamber may include a thermal barrier at least partially surrounding the vapor tube.

The exhaust gas heat exchanger includes exhaust tubes that receive heated combustion gasses from the combustion chamber. The exhaust tubes are surrounded by coolant to recover heat from the exhaust gasses that has not been transferred to the operating fluid. Coolant enters the housing and circulates first through the exhaust gas heat exchanger and then through the coolant jacket before leaving the housing.

The disclosed vapor tube is one form of a heat exchanger to transfer heat generated in the combustion chamber to operating fluid to generate vapor, but other forms of heat exchanger for this purpose are compatible with the disclosed evaporator. The vapor tube may be a continuous length of tubing formed into a helical coil surrounding a cylindrical space. A fuel combustor may be arranged to release heat and hot combustion gasses into the cylindrical space surrounded by the vapor tube. The vapor tube may include fins on its outside surface to expand the surface area for exchange of heat. The vapor tube may be a continuous length of tubing formed into two concentric helical coils, with a first coil including an operating fluid inlet and the second coil including a vapor outlet, the coils being connected at their lower ends. The helical coils may have a vertical orientation and be concentric within a cylindrical combustion chamber. The helical coils may be wound in opposite directions and have a downward pitch from an inlet/outlet end outside the evaporator housing to their connected lower ends. The rings of one helical coil may be radially spaced from the rings of the other helical coil and may cross each other at an acute angle when viewed from a radial direction. The rings of each helical coil are parallel with each other and are concentric with the rings of the other helical coil, but are not parallel with the rings of the other helical coil. Adjacent rings of the coiled vapor tube may be spaced apart by the height of fins projecting from an outside surface of the vapor tube. The combustion chamber may include a combustion baffle spanning the lower end of the cylindrical space surrounded by the helical vapor tube. The combustion baffle may include a thermal barrier.

In some embodiments, the evaporator may incorporate a condenser within the housing and in fluid communication with the exhaust gas heat exchanger and water jacket. The condenser includes an inlet for saturated vapor that has passed through an expander, and a condensate outlet for condensed operating fluid. The condenser is a heat exchanger configured to remove heat from the saturated vapor. Coolant circulates through the condenser to remove heat. Coolant may enter the evaporator housing at the condenser before circulating through the exhaust gas heat exchanger and water jacket. The condenser may have a heat exchange configuration similar to the exhaust gas heat exchanger, or may be of a different configuration.

The evaporator may include a resistance heater arranged to heat said coolant when connected to electrical power. The resistance heater may be located in a central space surrounded by the condenser and/or exhaust gas heat exchanger and in contact with the coolant.

DETAILED DESCRIPTION

The disclosure relates to an evaporator with integrated heat recovery for use in generating vapor-phase operating fluid. The vapor-phase operating fluid may be delivered to an expander such as a turbine which converts thermal energy in the vapor-phase operating fluid into mechanical work. The evaporator described in this disclosure is a steam generator, but the disclosed structures, relationships and methods of manufacture apply to evaporators used with operating fluids such as organic refrigerants. In the context of this disclosure the term "steam generator" is interchangeable with "evaporator" and references to steam are interchangeable with vapor-phase organic refrigerants. Below, the terms "water" and "feed water" are an example of one operating fluid compatible with the disclosed evaporator.

Figure 1:
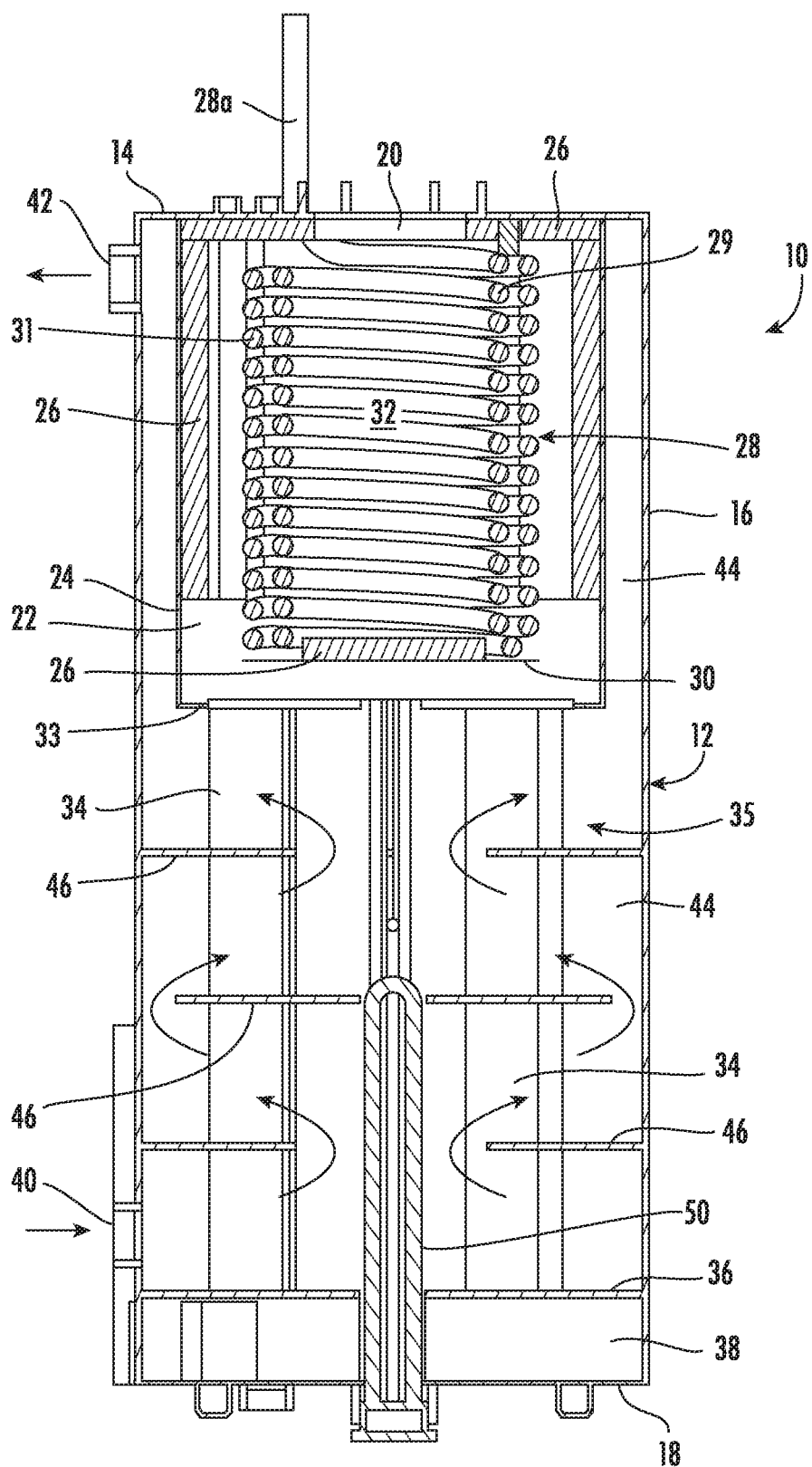
FIG. 1 is a sectional view of a first embodiment of an evaporator with integrated heat recovery according to aspects of the disclosure.
Figure 2:
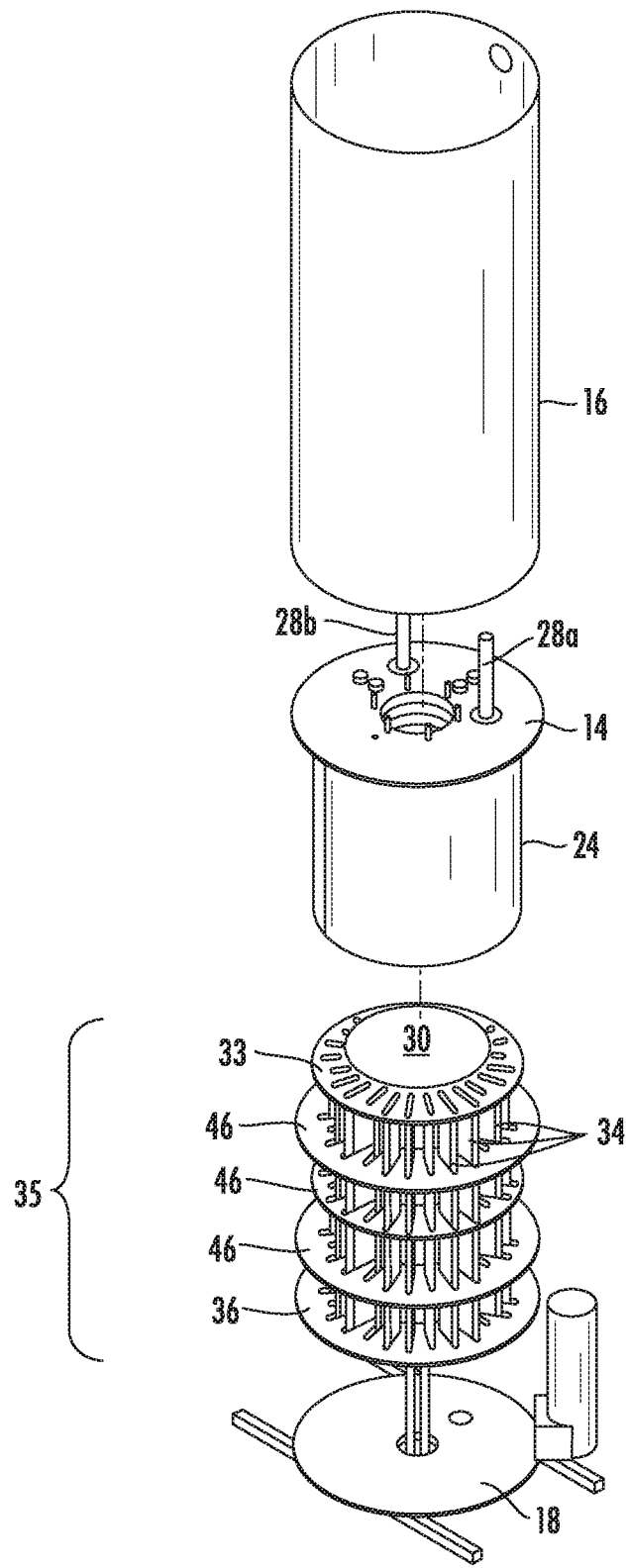
FIG. 2 is an exploded perspective view of the evaporator of FIG. 1.

FIGS. 1 and 2 illustrate a first embodiment of a steam generator (evaporator) with integrated heat recovery according to aspects of the disclosure. The steam generator 10 is contained in a housing 12 including a top plate 14, a side wall 16 and a bottom plate 18. The top plate 14 defines an opening 20 for a flame tube assembly of a fuel burner (not shown) and is connected to the side wall 16 to form the top of the housing 12. A combustion chamber 22 is defined by a cylindrical combustion chamber wall 24 connected at its upper end to the bottom surface of the top plate 14. Insulation 26 surrounds at least the top and upper portion of the side of the combustion chamber 22. The top plate 14 also defines two openings for the ends 28a, 28b of a steam (vapor) tube 28. The term "steam tube" is interchangeable with "vapor tube" in the context of this disclosure, and refers generally to a heat exchange structure that transfers heat to an operating fluid to generate vapor-phase operating fluid. As best shown in FIG. 2, the steam tube 28 is a tube with a circular cross section that is bent to form two coaxial coils suspended beneath the top plate 14. The coiled steam tube 28 occupies a portion of the combustion chamber 22 inward of the insulation 26, with the center of the combustion chamber available for the flame tube of the fuel burner (not shown). Fuel combusted in the combustion chamber 22 produces heat and hot exhaust gas which fill the combustion chamber and heat the steam tube 28. The insulation 26 retains heat in the combustion chamber 22 to maximize heat transfer to water and steam in the steam tube 28.

A disc-shaped combustion baffle 30 spans a lower end of the cylindrical space 32 defined within the steam coil 28. The combustion baffle 30 supports a circular piece of insulation 26 that is spaced apart from the lower end of the steam tube 28. The combustion baffle 30 and insulation 26 contain heat and hot combustion gasses in the vicinity of the steam tube 28 to facilitate heat transfer. The combustion baffle 30 blocks the most direct route for combustion gasses away from the burner (not shown), forcing the hot combustion gasses to flow radially outward between the coils of the steam tube 28.

In the embodiment of FIGS. 1 and 2, the steam tube 28 is constructed of a single length of stainless steel tube having an overall length of approximately 40' (feet), an inside diameter of 0.652" (inches), an internal surface area of 983 in$^2$ (square inches), and an internal volume of approximately 160 in$^3$ (cubic inches). The outside diameter of the steam tube 28 is 0.75" (inches) and the external surface area of the steam tube is approximately 1,700 in$^2$ (square inches). The tubing is formed into two concentric helical coils wound in opposite directions, with the inner coil 29 associated with a feed water inlet at one end 28a of the steam tube 20. In the context of this disclosure, each revolution of a coil is referred to as a "ring," even though the ends of each revolution are axially offset and connect to the previous and subsequent rings of the coil. The inner coil 29 is wound so that each ring of the inner coil 29 is angled downward at a slope defined by an acute angle of about 5° relative to plane perpendicular to a central axis of the steam tube 28. This allows feed water delivered to the end 28a of the steam tube 28 to flow and spread along the tube by gravity. The lower most ring of the inner coil 29 crosses radially outward to connect with the lower most ring of the outer coil 31. The outer coil 31 is wound to form a helical coil where each ring of the outer coil is angled upward at a slope defined by an acute angle of about 5° relative to a plane perpendicular to a central axis of the steam tube 28. The inner coil 29 may be described as a "right handed" helix, while the outer coil 31 may be described as a "left handed" helix. The result of the configuration is two concentric helices, with the inner helix having a slight downward trajectory, while the outer helix has a slight upward trajectory. When viewed from the side, rings of the inner coil 29 cross rings of the outer coil 31 at an angle of about 10°, or twice the slope of the coils.

In the steam generator of FIGS. 1 and 2, the steam tube 28 includes fins on its outside surface, to enhance the surface area for heat transfer. The spacing between the rings of each coil and between the inner coil 29 and the outer coil 31 is dictated by the height of the fins. One object of the disclosed steam tube configuration is to provide sufficient heat transfer surface area and internal volume in a compact space. The steam tube 28 disclosed and described in the present disclosure is one example of a heat exchange structure that can be used to generate vapor-phase working fluid. Other heat exchange structures As shown in FIGS. 1 and 2, the lower end of the combustion chamber wall 24 is connected to an exhaust manifold including exhaust tubes 34 extending downward from the combustion chamber 22. The exhaust manifold includes an upper disc 33, the exhaust tubes 34 and a lower disc 36. The upper disc 33 spans the lower end of the combustion chamber 22 and is connected to the bottom end of the combustion chamber wall 24 to form a sealed container that directs exhaust gasses into the exhaust tubes 34. The exhaust tubes 34 are joined to the upper disc 33 by a method such as welding or brazing that forms a strong, sealed connection. The exhaust tubes 34 are flattened and formed to enhance their surface area. The lower end of the exhaust tubes 34 are joined to the lower disc 36 by a method such as welding or brazing that forms a strong, sealed connection. An exhaust outlet chamber 38 is formed between the lower disc 36 and the bottom plate 18 of the housing 12. The outer circumference of the lower disc 36 is joined to the side wall of the housing 12 by a method such as welding or brazing to form a permanent, sealed connection between the lower disc 36 and the side wall 16 of the housing 12. Hot exhaust gasses pass from the combustion chamber 22 through the exhaust tubes 34 into the exhaust outlet chamber 38, from which they leave the steam generator 10. As best shown in FIG. 2, the flattened exhaust tubes 34 are arranged in a staggered, radial pattern surrounding a central space, with some exhaust tubes 34 being closer to the central space than others. The flattened exhaust tubes 34 are arranged with the long dimension parallel with a radius extending from the center of the housing 12 to the side wall 16.

The housing 12 includes a cooling fluid inlet 40 and cooling fluid outlet 42 that communicate with a coolant jacket 44 surrounding the combustion chamber 22 and exhaust tubes 34. The coolant jacket 44 extends from the top plate 14, to the lower disc 36 at the exhaust outlet chamber 38. Cooling fluid is circulated through the coolant jacket 40 to recover heat from the exhaust gasses and combustion chamber 22 that is not used to generate steam. In the disclosed embodiment, the fluid used as coolant is water, but other coolant fluids can be used. The cooling fluid inlet 40 enters the coolant jacket 44 just above the lower disc 36 and leaves the coolant jacket 44 just below the top plate 14. Baffles 46 direct cooling fluid around the exhaust tubes 34 in a convoluted radially in-out path to enhance heat transfer from the exhaust gasses to the cooling fluid. The baffles 46 work in concert with the radial orientation of the flattened exhaust tubes to promote circulation of the cooling fluid in a pattern that enhances heat recovery from the exhaust tubes 34, the upper and lower discs 33, 36, the combustion chamber wall 24 and the top plate 14 of the housing 12. The cooling fluid flows through an annular space between the sidewall 16 of the housing 12 and the combustion chamber wall 24 and beneath the top plate 14. Cooling fluid in this annular space cools the top plate 14 and in combination with the insulation 26 prevents excess heat from escaping to the surrounding environment through the upper end of the steam generator 10.

The insulation 26 at the top, sides and bottom of the combustion chamber 22 provides a thermal barrier to concentrate heat in the combustion chamber 22 to generate steam at temperatures between 450° F. and 900° F. The insulation 26 beneath the top plate 14, in combination with cooling fluid in contact with the top plate 14, prevent the top plate 14 from becoming too hot, which would result in undesirable heat radiation from the steam generator 10. The term "insulation" as used in this disclosure means "materials or structures used to reduce the rate of heat transfer." Insulation can be as simple as an air gap, or may include any known type of insulation used in furnaces, such as refractory ceramic fiber, mineral fiber, or the like. Sealed, evacuated spaces can also be used to provide the desired reduction in the rate of heat transfer.

The steam tube 28 of the steam generator illustrated in FIGS. 1 and 2 includes an inner coil 29 with each ring having a downward slope. The downward slope of the rings of the inner coil 29 allows water entering the steam tube 28 to flow along the inside of the inner coil 29 by gravity. As the water flows down the inner coil 29, it absorbs heat from the steam tube 28 and transitions to steam. The length of the inner coil 29 and the temperature of the combustion chamber 22 ensure that all the water entering the steam tube 28 transitions to steam before reaching the bottom of the steam tube 28. This arrangement prevents the accumulation of liquid water at the bottom of the steam tube 28, which can cause system instability. The lower most ring of the inner coil 29 spirals radially outward to connect with the lower most ring of the outer coil 31. Steam formed in the inner coil continues to absorb heat as it passes through the outer coil 31 of the steam tube 28, exiting the steam tube 28 as super-heated dry steam that can be used to drive an expander such as a steam turbine.

The steam generator 10 of FIGS. 1 and 2 integrate a water jacket 44 surrounding a combustion chamber 22 with an exhaust gas heat recovery heat exchanger 35 in a common housing 12 to provide a compact configuration that effectively contains the high temperatures required to form steam in the combustion chamber 22. The disclosed water jacketed steam generator 10 also recovers heat from the exhaust gasses into a heat recovery fluid, where the recovered heat can be used for other purposes, enhancing the overall efficiency of a system incorporating the disclosed steam generator 10.

FIGS. 1 and 2 show a resistance heater 50 extending into the water jacket 44. Resistance heater 50 generates heat from an applied electrical current. Heat generated by the resistance heater 50 is transferred to the cooling fluid circulating in the water jacket 44. In some system configurations, it may be advantageous to convert excess electrical energy into heat that can be stored or used in the facility where the steam generator 10 is installed. The need to "dump" excess electrical energy may arise in electrical grids having a significant portion of power generated from sources such as wind turbines or solar panels. It is known that wind turbines and solar panels can generate excess electrical energy at times that do not coincide with peak energy demand, resulting in situations where excess electrical power on the grid must be managed. Incorporating a resistance heater 50 into the disclosed steam generator 10 allows the steam generator 10 to transform excess electrical power into heat that can be stored or used locally.

Figure 3:
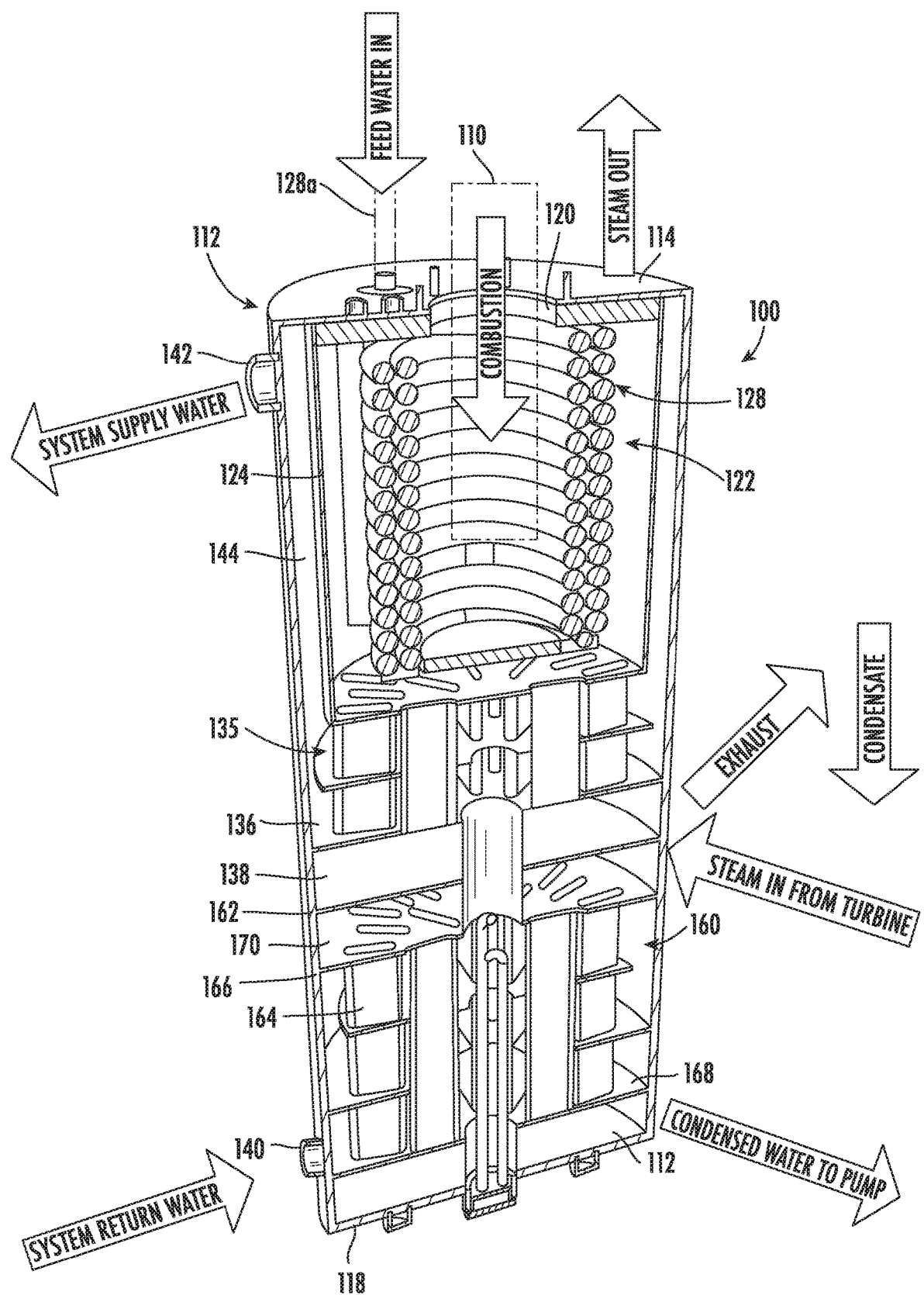
FIG. 3 is a sectional perspective view of an alternative evaporator according to aspects of the disclosure.

FIG. 3 illustrates an alternative embodiment of a steam generator 100 which incorporates a steam condenser 160 within the housing 112. The configuration of FIG. 3 is useful in systems where the steam generator is part of a micro combined heat and power system which employs steam generated by the steam generator 100 to drive an expander such as a steam turbine to generate electricity. In such systems, steam leaving the turbine (or other expander) must be condensed back to liquid water, which can be re-circulated through the steam generator 100 and turbine. It is typical for the condenser to be a dedicated heat exchanger, separate from the steam generator, requiring conduits and connections for steam, coolant, and condensate, as well as a housing that circulates coolant fluid to remove heat from the steam. Incorporating steam condenser 160 into the same housing 112 as the steam tube 128 and exhaust heat recovery heat exchanger 135 reduces the cost of the system, and makes the system more compact. Some of the fluid connections and flow paths can be integrated into a single assembly, reducing the number of locations for leaks. A common housing 112 also enhances heat recovery by eliminating heat that would be lost to the surrounding environment from separate structures and the necessary fluid conduits.

The steam generator 100 is configured and functions similarly to the steam generator 10 of FIGS. 1 and 2 and will be described in detail only with respect to how it differs from steam generator 10. The combustion chamber 122 and steam tube 128 are configured and function as they do in the steam generator 10 of FIGS. 1 and 2. A fuel combustor 110 is schematically shown in the opening 120 in the top plate 114. The lower disc 136 that defines the lower end of the exhaust manifold is located about half way down the housing 112, leaving room at the bottom of the housing for a steam condenser 160. An exhaust outlet chamber 138 is defined between lower disc 136 and a top wall 162 of the steam condenser 160. As shown in FIG. 3, the steam condenser 160 has a heat exchange configuration similar to that of the exhaust heat recovery configuration of steam generator 10 described above. The steam condenser 160 includes flattened condenser tubes 164 that extend between a condenser upper disc 166 and a condenser lower disc 168. A steam intake chamber 170 is defined between the top wall 162 and the upper disc 166. Steam leaving the turbine enters the steam intake chamber 170 and passes through the condenser tubes 164, which are surrounded by cooling fluid introduced at inlet 140. The steam is condensed into water and the heat removed from the steam is captured in the cooling fluid. A condensed water chamber 172 is defined between the condenser lower disc 168 and the housing bottom plate 118. Water condensed from the steam accumulates in the condensed water chamber 172 and is pumped back to the steam tube inlet 128a to be converted to steam.

In the embodiment of a steam generator 100 of FIG. 3, the exhaust heat recovery heat exchanger 135 and the condenser 160 have a similar configuration, with both employing flattened tubes surrounded by cooling fluid. Neither the exhaust heat recovery heat exchanger 135 nor the condenser 160 are limited to the disclosed heat exchanger configuration, and each of the exhaust heat recovery heat exchanger 135 and the condenser 160 can have a configuration different from the other. The housing 112 may be extended vertically or radially to provide an interior volume necessary to accommodate both the exhaust gas heat exchanger 135 and the condenser 160.

As shown in FIG. 3, the coolant jacket 144 of the steam generator 100 surrounds the condenser 160, the exhaust heat recovery heat exchanger 135 and fills the annular space surrounding the combustion chamber wall 124. Coolant enters the condenser 160 at coolant inlet 140 and passes through a coolant duct 174 connecting the coolant volume of the condenser 160 to the coolant volume of the exhaust gas heat exchanger 135. Cooling fluid circulates through the exhaust gas heat exchanger 135 and though the annular space surrounding the combustion chamber wall 124 before leaving the steam generator at coolant outlet 142. Steam generator 100 also includes a resistance heater 150 that is surrounded by cooling fluid, but isolated from the exhaust outlet chamber 138, steam inlet chamber 170 and condensed water chamber 172.

Figure 4:
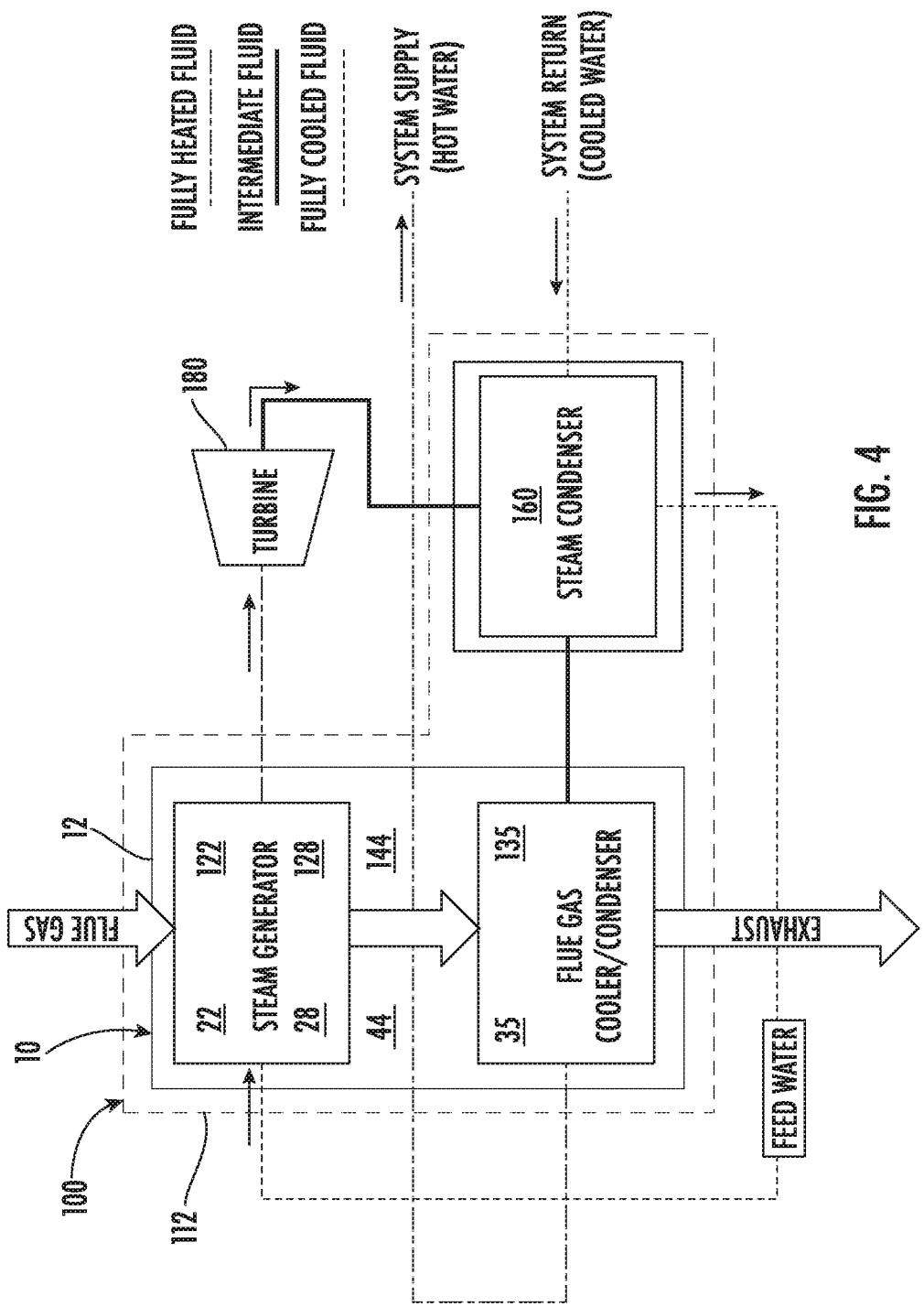
FIG. 4 is a schematic representation of a micro CHP system incorporating the disclosed heat recovery configurations.

FIG. 4 is a schematic representation of the steam generators 10, 100 in conjunction with a steam turbine 180, showing the thermal relationships among the components. Reference numeral 10 designates a representation of the thermal relationships in a system employing the steam generator 10 of FIGS. 1 and 2. The steam generator 10 includes combustion chamber 22 surrounding steam tube 28, which define a heat exchanger where the combustion chamber concentrates heated combustion gasses to heat a steam tube 28 and transform liquid feed water into superheated, dry steam that is used to drive an expander such as turbine 180. The steam generator 10 incorporates the combustion chamber 22 and steam tube 28 into a housing along with exhaust gas heat exchanger 35. The condenser 160 is shown in a separate housing, with lines for turbine exhaust, feed water, and cooling fluid representing fluid flow conduits that connect the condenser 160 to the steam generator 10. Feed water is delivered to steam tube 28, where it absorbs heat and transitions to super-heated dry steam that is fed to the turbine 180. Turbine exhaust is fed to the condenser 160, which condenses the turbine exhaust steam into water, which is returned to the steam tube 28 in a closed circuit. Cooling water absorbs heat from the turbine exhaust steam in the condenser 160 and then is delivered to the exhaust heat recovery heat exchanger 35 to absorb heat from the combustion chamber exhaust gasses. Heated coolant fluid is delivered to other systems for uses such as hydronic heating, domestic hot water production, or heat for desiccant based air conditioning systems. It will be observed that steam generator 10 requires a separate structure and fluid connections for the condenser 160, which are external to the steam generator 10.

Reference numeral 100 designates a representation of steam generator 100, which incorporates the condenser 160 into the same housing 112 along with the combustion chamber 122, steam tube 128, and exhaust gas heat exchanger 135. In this configuration, fluid connections for the cooling fluid are internal to the housing 112. Cooling fluid leaving the condenser 160 is directed to the exhaust gas heat exchanger 135 and to the coolant jacket 144 surrounding the combustion chamber 122 by internal fluid flow paths. Putting the exhaust gas heat exchanger 135 and condenser 160 in the same housing reduces the costs of manufacture, makes the system more compact, and reduces loss of heat from separate system components. It may also be possible to incorporate the flow path and feed pump (not shown) for feed water from the condenser 160 to the steam tube 128 into the housing 112, further reducing connections external to the housing 112.

What is claimed:

1. An evaporator with integrated heat recovery, said evaporator comprising:
    a housing;
    a combustion chamber within said housing, said combustion chamber surrounding a fuel burner combusting fuel to generate heat and a flow of heated combustion gasses;
    a vapor tube arranged in said combustion chamber, said vapor tube having an inlet end receiving a flow of operating fluid which absorbs heat from said heated combustion gasses and transitions to vapor, which leaves said vapor tube at an outlet end;
    an exhaust gas heat exchanger within said housing and comprising a plurality of exhaust tubes receiving said flow of heated combustion gasses from said combustion chamber;
    a coolant jacket inside said housing at least partially surrounding said combustion chamber and in fluid communication with said exhaust gas heat exchanger, wherein coolant enters said housing and circulates through said exhaust gas heat exchanger and said coolant jacket before leaving said housing.

2. The evaporator of claim 1, wherein said coolant jacket includes an annular space surrounding a side wall of said combustion chamber and inside said housing.

3. The evaporator of claim 1, wherein said combustion chamber includes a thermal barrier at least partially surrounding said vapor tube.

4. The evaporator of claim 1, wherein said vapor tube comprises a continuous length of tubing formed into a helical coil surrounding a cylindrical space.

5. The evaporator of claim 1, wherein said vapor tube comprises a continuous length of finned tubing formed into a helical coil.

6. The evaporator of claim 1, wherein said vapor tube comprises a continuous length of tubing formed into a helical coil surrounding a cylindrical space, said housing defines an opening communicating with one end of said cylindrical space and said combustion chamber comprises a combustion baffle spanning a second end of said cylindrical space.

7. The evaporator of claim 1, comprising a condenser within said housing and in fluid communication with said exhaust gas heat exchanger, coolant circulates through said condenser, exhaust gas heat exchanger and said coolant jacket before leaving said housing.

8. The evaporator of claim 1, wherein vapor tube comprises a continuous length of tubing formed into two concentric helical coils wound in opposite directions and surrounding a cylindrical space, said cylindrical space having a vertical orientation.

9. The evaporator of claim 8, wherein said concentric helical coils comprise an inner coil and an outer coil, each coil including a plurality of revolutions of said tubing, said inner coil in fluid communication with an operating fluid inlet at an upper end and connected to said outer coil at a lower end, each revolution of said inner coil having a downward slope.

10. The evaporator of claim 9, wherein each revolution of said outer coil has an upward slope and communicates with a steam outlet at an upper end of said outer coil.

11. The evaporator of claim 1, comprising a resistance heater arranged to heat said coolant when connected to electrical power.

12. The evaporator of claim 1, wherein said operating fluid is water and said vapor is steam.

* * * * *